United States Patent
Chen et al.

(10) Patent No.: US 12,254,468 B2
(45) Date of Patent: Mar. 18, 2025

(54) METHOD AND DEVICE FOR PREVENTING FORKING OF BLOCKCHAIN

(71) Applicants: THE BLOCKHOUSE TECHNOLOGY LIMITED, Oxfordshire (GB); Bangdao Chen, Shenzhen (CN)

(72) Inventors: Bangdao Chen, Shenzhen (CN); Andrew William Roscoe, Oxfordshire (GB)

(73) Assignee: THE BLOCKHOUSE TECHNOLOGY LIMITED, Oxfordshire (GB)

( * ) Notice: Subject to any disclaimer, the term of this patent is extended or adjusted under 35 U.S.C. 154(b) by 289 days.

(21) Appl. No.: 17/917,013

(22) PCT Filed: Apr. 8, 2021

(86) PCT No.: PCT/CN2021/085888
§ 371 (c)(1),
(2) Date: Oct. 5, 2022

(87) PCT Pub. No.: WO2021/204181
PCT Pub. Date: Oct. 14, 2021

(65) Prior Publication Data
US 2023/0153806 A1   May 18, 2023

(30) Foreign Application Priority Data
Apr. 9, 2020   (CN) .................. 202010276328.1

(51) Int. Cl.
G06Q 20/38   (2012.01)
H04L 9/00   (2022.01)
H04L 9/32   (2006.01)

(52) U.S. Cl.
CPC ....... *G06Q 20/3829* (2013.01); *G06Q 20/389* (2013.01); *H04L 9/3247* (2013.01); *H04L 9/50* (2022.05)

(58) Field of Classification Search
None
See application file for complete search history.

(56) References Cited

U.S. PATENT DOCUMENTS 10,630,463 B2 *  4/2020  Mankovskii .......... H04L 9/3239
11,831,749 B1 * 11/2023  Fisher .................. H04L 9/0637
(Continued)

FOREIGN PATENT DOCUMENTS

CN   107171810 A   9/2017
CN   108880795 A   11/2018
(Continued)

OTHER PUBLICATIONS

NPL—Butijn (Butijn et al., "Blockchains: a Systematic Multivocal Literature Review", ACM Computing Surveys. 53. 1-37. 10.1145/3369052, Nov. 2019) (Year: 2019).*

(Continued)

*Primary Examiner* — Polina G Peach
*Assistant Examiner* — Anugeetha Kunjithapatham
(74) *Attorney, Agent, or Firm* — SOROKER AGMON NORDMAN PTE LTD

(57) ABSTRACT

Disclosed is a method and device for preventing blockchain forking. The method includes: selecting s consecutive blocks $B_n$ to $B_{n+s}$; generating a key pair for block $B_n$ by a node $A_n$ that creates the block $B_n$; holding the node $A_n$ active in the blockchain's continuously generating blocks $B_{n+1}$ to $B_{n+s}$ until the block $B_{n+s}$ of s consecutive blocks becomes tamper-proof; in response to that, signing on the block $B_{n+s}$ with the private key $PK'_n$; in response to the blockchain's subsequently generating a block $B_m$(m>n+s), placing the (Continued)

signature in $B_m$; making nodes creating each of the s blocks $B_n$ to $B_{n+s}$ all execute afore-mentioned steps, thereby forming multiple backlinks associated with the blockchain's block size. The number of backlinks is used for determining blockchain forking by a newly-added node creating a new block.

29 Claims, 6 Drawing Sheets

(56) References Cited

U.S. PATENT DOCUMENTS

| | | | |
|---|---|---|---|
| 2016/0330034 A1* | 11/2016 | Back | G06Q 20/065 |
| 2019/0268138 A1 | 8/2019 | Mankovskii et al. | |
| 2020/0014529 A1* | 1/2020 | Kanza | G07F 9/001 |
| 2023/0119035 A1* | 4/2023 | Mee | H04L 9/50 |
| | | | 705/75 |

FOREIGN PATENT DOCUMENTS

| | | | |
|---|---|---|---|
| CN | 109191120 A | | 1/2019 |
| CN | 109379396 A | | 2/2019 |
| CN | 110704464 A | | 1/2020 |
| CN | 111445247 A | | 7/2020 |

OTHER PUBLICATIONS

Zhang et al., 2019. Security and Privacy on Blockchain. ACM Comput. Surv. 52, 3, Article 51 (Jul. 2019) (Year: 2019).*

* cited by examiner

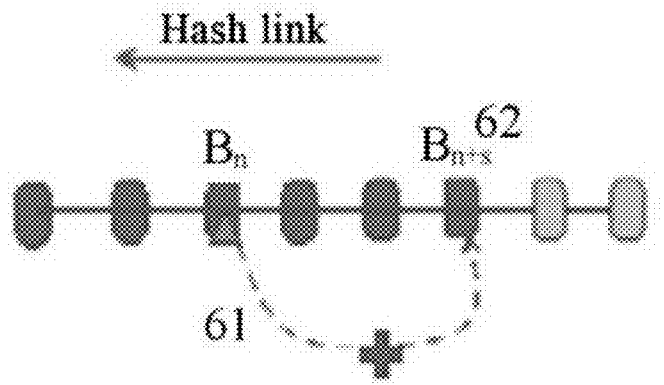

61 the public key material is located in $B_n$ ▲

62 in this stage, the signature/link is still located outside the blockchain, which is not checked yet, and the short-term signature may be located in the transaction pool

*FIG. 6*

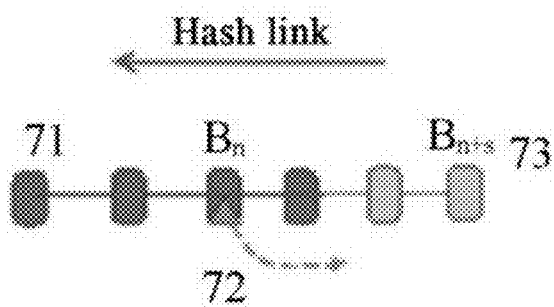

- 71 the current $B_n$ has become a tamper-proof block
- ▲ 72 the public key material in the block $B_m$ is unavailable
- 73 $B_{n+s}$ has been generated, but has not become a tamper-proof block, so that backlinks have not formed available backlinks

*FIG. 7*

81 $B_n$ has not been generated
82 the public key material has not formed available backlinks public key material
confirmed signatures
unpublished signatures
45 complete backlinks
46 calculated but unplaced links
47 unavailable links

METHOD AND DEVICE FOR PREVENTING FORKING OF BLOCKCHAIN

TECHNICAL FIELD

The present disclosure generally relates to the technical field of blockchain, and in particular to a method and device for preventing forking of blockchain.

BACKGROUND OF THE INVENTION

With the rapid development of blockchain technology, many innovations have been put forward in design, mainly focusing on avoiding evil and consensus mechanisms. Avoiding evil is based on the principle of economic game. In an open network, technical means cannot guarantee that everyone is cooperative, but the economic game can be used to make cooperators gain benefits and make non-cooperators suffer losses and risks. For example, all attempting participants in the Bitcoin network first have to pay the price of mining and consume computing power, and the decision right to get a new block is proportional to the computing power mortgaged. In case of failure, the computing power will be confiscated and become a sunk cost. When there are a lot of participants in the network, the computational cost of individuals trying to get the decision right of the new block is huge. Although the price for doing evil may outweigh the benefits, the gains from doing evil are relatively high. As a result, the trends and ways of doing evil will continue to be unabated.

In addition, the traditional consensus problem is to consider how to quickly reach a consensus in a relatively closed distributed system in which normal nodes and failed nodes are allowed to exist at the same time, so as to continue to generate blocks in the blockchain. However, most of the environments in which existing blockchains are applied are completely open and may face a variety of attack scenarios. At the same time, the network quality based on Internet can only guarantee to match the application of blockchains as much as possible but not completely, which makes the problem more complicated and makes it difficult to use the traditional consensus algorithm in this scenario. At present, a more common POW (proof of work) consensus mechanism is a formula that is based on probability and gradually enhances confirmation over time, that is, existing reached results may be overturned theoretically, but the price of an attacker will rise exponentially over time, and the possibility of being overturned will decline exponentially.

A blockchain is a set of blocks, where each block contains hash operation values for all preceding blocks. A hash operation can map a plaintext string of arbitrary length into a binary hash string that is shorter and usually fixed-length, and it is difficult to map different plaintexts to the same hash value. The hash algorithm used by the blockchain can calculate a hash value in a limited time and limited resources given the plaintext. However, given several hash values, it is difficult, or even impossible, to deduce the plaintext inversely in a limited time. Due to the high sensitivity to changes in original input information, it is also difficult to find two plaintexts with different contents that can obtain the same hash value, that is, the hash operation is collision-resistant. These attributes directly cause each block in a legitimate main blockchain to eventually trace its origin forward, all pointing to the Genesis block.

However, the blockchain structure supported by the hash link is essentially not a chain structure, but a tree structure with the blockchain as the root node. Therefore, as a block on a legitimate blockchain, it will have an evolution track with a definite number from the Genesis block, unless the Genesis block has a block close to itself.

There are many important and meaningful assumptions about the design of blockchain.

First, it is about the detailed explanation of the tree structure. If there are two blockchains, the contents of which are the same at a certain position, and the starting points of which are the Genesis block, the two blockchains must be the same from the Genesis block to an intersection block. The blockchain, known as the main chain, finds a single chain along a child-parent link in a DAG (directed acyclic graph) created by a designated user, associating all units together. Starting with any vertex, a main chain can be built. If main chains are chosen from two different vertices with the same rules, the two main chains, once intersect in the backtracking process, will completely overlap after the intersecting point, and the overlapping part is called a stable main chain. The worst case is that the two main chains intersect at the Genesis block, and all units are either directly on this stable main chain or can be reached by a small number of jumps along the edge of the DAG from units on the stable main chain. Thus, the stable main chain can establish a total order between two conflicting disordered units.

Second, when there is no forking at the n-th position of block itself and the first (n−1) positions in the sequence formed by the blockchain, the n-th block is defined as immutable or tamper-proof. When the structure of the blockchain is viewed from outside the blockchain or from the perspective of a single node, the unchangeable portion only grows unidirectionally. However, the unchangeable sequence seen from a single node is the same as or a part of the prefix of the unchangeable sequence seen from outside the blockchain.

Third, anyone can publish an additional node on the public chain that points to another block that differs from the last correct block. In this case the fork point is close to the true head, can become part of the normal mining protocol, and it is possible to propose an alternative to the legitimate chain, thereby winning a legitimate alternative position during blockchain generation. This situation is not the forking discussed herein. In practice, a blockchain is allowed to contain a certain amount of bad or dishonest nodes and untrusted nodes, where these nodes may not comply with the blockchain protocol, which herein is a formal set of rules describing how data is transmitted or exchanged, particularly throughout the network. However, depending on the characteristics of the blockchain protocol, these bad nodes are also a member of the mining collection, and once their range of hash values is selected for compliance with the protocol requirements, they can publish blocks at any time by themselves. The block published at this point is not located on the legitimate chain, but on a forking derived from a certain position of the legitimate chain. The block published at this point is "pseudo-unmodifiable". In view of the disadvantages of the existing blockchain mechanism, the present invention modifies the basic physical architecture of the blockchain, and introduces the backlinking mechanism into the blockchain, so that each published new block that is considered to be tamper-proof can be definitely "unmodifiable", and any trusted node will trust the authenticity of the information in the new block.

Fourth, each block contains timestamp information. If the timestamp of the existing block is located on the legal chain, it should be strictly greater than the timestamp information of the preceding block, because the generation of timestamp information is greatly related to and close to the true time of block publication. For the mining rate, we expect there to be upper and lower limits, that is, the rate at which the block is generated is defined within a certain time interval. This assumption may, for example, remind the time or the timestamp in a reasonably accurate manner through an honest node in the blockchain, for example, by setting an internal clock, so as to determine time-related events to avoid forking.

Fifth, the blockchain is divided into the public chain and the consortium chain according to the scope of open objects. Any individual or group in the world can send a transaction through the public chain, and the transaction can be effectively confirmed by the blockchain, and anyone can participate in its consensus process. It is precisely because the access threshold of the public chain is low that anyone can join and quit freely. The identity of the participant is hidden but all data is exposed by default, so there is a greater risk of forking.

A blockchain is used as a ledger, and in each fixed period of time, a bookkeeper is randomly selected to record the transactions for that period of time and place them in the blockchain to form a "transaction page". After a period of time, the "transaction page" forms the latest page on the ledger. Thanks to the data structure design of the blockchain, after each "transaction page" is signed by the bookkeeper, the transaction data cannot be tampered with. After the next transaction page is determined, any content of the previous transaction page cannot be tampered with. And according to the current blockchain data structure, after the previous transaction page is determined, there is no content association between the content of the next transaction page and the previous transaction page, and only the page number needs to be increased by 1. Each person who gets the ledger will view the page number order, and if it is correct, the ledger composed of "transaction pages" is considered legitimate. However, if a group of malicious bookkeepers can forge the following pages in order from any page in the middle of the ledger, when a newly joined block creator obtains the forged ledger, the forged ledger will be mistaken for a real ledger if its page number order is still correct.

In the prior art, the forking problem is solved by establishing a total order between two conflicting units. First, the units directly located on the stable main chain are indexed, where the Genesis unit is indexed as 0, the sub-unit of the Genesis unit is indexed as 1, and so on. All the units on the main chain are assigned indices along the stable main chain, and for a unit not on the stable main chain, the first main chain unit directly or indirectly referring to this unit is found, so that each unit is assigned an MCI (main chain index). Then, for a given two units, the unit with a smaller MCI is considered to be generated earlier. If the two units have exactly the same MCI and are in conflict, the unit with a smaller hash value is valid. The main chain construction process is actually a recursive call process of the optimal parent unit selection algorithm. The optimal parent unit is selected by comparing the number of notarized units in the optional path (units issued by the same notary are counted once), that is, the "transaction page" can be verified by page number order. The notarized units are issued by witnesses who are non-anonymous, long-term community participants in a good reputation, or organizations that actively maintain the healthy development of the network. While they are expected to act honestly, it would be unreasonable to trust anyone witness completely. Thus, different witnesses are also chosen, and this method itself gives the opportunity for bad nodes to cooperate with evil.

In the prior art, the blockchain employs a POW mechanism in relation to the above, which has an important advantage over other mining protocols in preventing forking. According to the foregoing description of the internal protocol working mechanism of POW, under the incentive of the reward, a potential user is more willing to choose the main chain as a basis for continuing to work, even if the simultaneously obtains information about both the main chain and the evil chain as a fork. Therefore, the longest chain model under the POW mechanism provides the most effective security theory, but the security theory can be implemented only on the premise that all nodes can and have learned the existence of a legitimate chain head without forking actually, and all subsequent blocks must be analyzed from the head of the blockchain. In other words, under the current blockchain architecture, when a node is determining whether the proposed head is a real head or a camouflaged head exists on the forked chain, the node usually adopts the following manner: obtaining the whole generation process of the block or searching surrounding nodes (connection nodes specified in the transport protocol) for blockchain-related information, and determining, on this basis, whether the blockchain forks. However, due to the unpredictable change of the distributed system in the network, the node will temporarily disconnect from the storage portion where the main chain is located or attacked by a malicious node, and some data in the subsequent process may be temporarily unreadable, but the process following the pointer to search for data does not realize this, at this time, a wrong conclusion about whether to continue to generate blocks on the main chain my be given, which will cause a series of wrong operations subsequently. In this case, there may be uncertainty in checking whether the designated blockchain is the main chain. Therefore, it is necessary to propose an improvement to the above manner, i.e., an improvement for a manner in which determination is made and data information is searched only based on limited blockchain information that can be received, so that a verification result for determining the main chain or the forked chain can still be obtained with more certainty in a case where the amount of information obtained is limited or in a case where the network communication is temporarily lost or the blockchain is attacked by a malicious node.

With respect to some loopholes of the public chain protocol POW (i.e., imperfections of the mining model), the defects of the search mode in the process of generating and maintaining the blockchain existing in the prior art, and the fact that the network communication in the real world cannot fully support the public chain application, it is necessary to propose a new basic architecture mode of the blockchain, that is, the security is not based on searching upward from the head, so as to reduce the risk of forking.

SUMMARY OF THE INVENTION

In view of the above technical problems, the present disclosure proposes a method and device for preventing forking of blockchain.

In one aspect of the present disclosure, a method for preventing blockchain forks is provided, for preventing a forked chain from being wrongly determined as the main chain so that the main chain is not accepted. The method is realized by establishing a backlink for each block of the blockchain and making a determination according to a number of backlinks, comprising steps of: S101, selecting s consecutive blocks $B_n$ to $B_{n+s}$; S102, by generating a node $A_n$ that creates the block $B_n$ in the s consecutive blocks, a key pair for the block $B_m$, wherein the block $B_m$ contains a public key $PK_n$ in the key pair, and a private key $PK'_n$ in the key pair is held individually by the node $A_n$; S103, holding the node $A_n$ active in a process of continuous generation of blocks $B_{n+1}$ to $B_{n+s}$n the blockchain until the block $B_{n+s}$ in the s consecutive blocks becomes a tamper-proof block; S104, in response to the block $B_{n+s}$ in the s consecutive blocks becoming a tamper-proof block, using the private key $PK'_n$ to sign on the block $B_{n+s}$; S105, in response to subsequent generation of a block $B_m$ in the blockchain, placing the signature in the block $B_m$, where m>n+s; S106, making the nodes creating each of the s consecutive blocks $B_n$ to $B_{n+s}$ all execute the steps S102 to S105, thereby forming a plurality of backlinks associated with a block size of the blockchain, and each block is proved by a preceding block to be present on the main chain of the blockchain; S107, when a new chain claiming to be on the legitimate main chain of the blockchain is received, determining by a newly added node whether the new chain forks according to the number of the backlinks, which comprises: in case that there are L backlinks in any s consecutive blocks of the new chain, in response to the condition that G>s/2 and $L \geqslant s/2$, determining the new chain to be a main chain that does not fork; in response to the condition that $1 \leqslant G \leqslant /2$ and L>s−G, determining the new chain to be a main chain that does not fork; in response to the condition that L<G, determining the new chain to be a forked chain; and in response to the condition that $G \leqslant L \leqslant G$, determining that it cannot be decided whether the new chain forks, wherein G represents a minimum number of trustworthy nodes in the s consecutive blocks.

In some embodiments, the node $A_a$ uses only once the private key $PK'_n$, and a key pair for each of the s consecutive blocks $B_n$ to $B_{n+s}$ is regenerated.

In some embodiments, the public key $PK_n$ is generated based on a hash signature algorithm, wherein the hash signature algorithm comprises a Lamport algorithm.

In some embodiments, the method further comprises placing the signature in a location other than the block $B_m$, of the blockchain to ensure that the signature can be placed in the block $B_m$ in the S105.

In some embodiments, the signature is deposited as a transaction in the blockchain.

In some embodiments, the signature is copied to obtain a copied signature, and both the signature and the copied signature are stored on the blockchain.

In some embodiments, the legitimacy of the signature is checked before execution of the S105, and the signature passing the legitimacy check proceeds to be executed with the S105, while the signature not passing the legitimacy check is considered by the blockchain as an illegitimate signature, and thereby is refused to be executed with the S105.

In some embodiments, the signature process is performed in a trusted execution environment (TEE).

In some embodiments, the blockchain is a public chain.

In some embodiments, the Genesis block of the blockchain is fully trusted, wherein a node of the Genesis block or a node of another block authorized by the Genesis block establishes a first backlink for the Genesis block, and after the first backlink appears, a probability of forking occurring within the s consecutive blocks covered by the first backlink is zero.

In some embodiments, determination of whether a new block is a head on the forked chain cannot be achieved in a case where a small amount of blocks exist at a head and tail of the blockchain, the method comprising: when the new block is at a position of a closest suspected fork point, all blocks before the new block are in the main chain, and a node creating the new block has not formed and placed a complete backlink in the blockchain, performing a short-term signature on a block or a block sequence that has been tamper-proof in successor blocks of the new block, and placing the short-term signature in one or more storage positions, so that when a number of successor blocks that have backlinks of the new block is less than s, if the short-term signature is not in real-time or expired, the short-term signature is used instead of the backlinks for determination; determining that the new block is on the forked chain in response to the short-term signature being absent or expired; or continuously waiting until a predetermined number of the backlinks are formed from the block to be determined by executing S101-S106 of the method, and determining whether the block to be determined is a head on the forked chain by determining whether the number of the backlinks satisfies the numerical range of S107.

In some embodiments, a search is performed on a chain portion other than the main chain of the blockchain to confirm whether there exists a duplicate signer that performs a duplicate signature on the backlinks. The duplicate signers represent a plurality of nodes that perform signature on two blocks to be generated, and the two blocks to be generated are respectively on the main chain and the forked chain, so that the forked chain is found according to a block created by the duplicate signer.

In some embodiments, for a suspected forked chain, the main chain portion before the suspected forked chain and a chain structure after an intersection of the suspected forked chain and the main chain are compared, wherein the main chain comprises the backlinks, and if a comparison result shows a significant difference in the number of the backlinks, the suspected forked chain is determined to be a forked chain, or otherwise, the suspected forked chain is determined to be the main chain.

In some embodiments, in response to using the private key $PK'_n$ to sign on the block $B_{n+s}$ in the S104, the private key $PK'_n$ is deleted to prevent it from being abused.

In one aspect of the present disclosure, a device for preventing blockchain forks is provided, comprising a blockchain and a processor, wherein the blockchain can ensure that information published thereon is tamper-proof, and the processor may be configured to: selecting s consecutive blocks $B_n$ to $B_{n+s}$; generating, by a node $A_n$ that creates the block $B_m$ in the s consecutive blocks, a key pair for the block $B_m$, wherein the block $B_m$ contains a public key $PK_n$ in the key pair, and a private key $PK'_n$ in the key pair is held individually by the node $A_n$; holding the node $A_n$ active in a process of continuous generation of blocks $B_{n+1}$ to $B_{n+s}$n the blockchain until the block $B_{n+s}$ in the s consecutive blocks becomes a tamper-proof block; in response to the block $B_{n+s}$; in the s consecutive blocks becoming a tamper-proof block, using the private key $PK'_n$ to sign on the block $B_{n+s}$; in response to subsequent generation of a block $B_m$ in the blockchain, placing the signature in the block $B_m$, where m>n+s; making nodes creating each of the s consecutive blocks $B_n$ to $B_{n+s}$ all execute the forgoing processes (which correspond to the steps S102-S105 of the method), thereby forming a plurality of backlinks associated with a block size of the blockchain, wherein each block is proven by a preceding block to be present on a main chain of the blockchain; and when a new chain claiming to be on the legitimate main chain of the blockchain is received, determining by a newly added node whether the new chain forks according to the number of the backlinks, which comprises:

in case that there are L backlinks in any s consecutive blocks of the new chain, in response to the condition that G>s/2 and L ⩾ /2, determining the new chain to be a main chain that does not fork; in response to the condition that 1 ⩽ G ⩽ s/2 and L>s−G, determining the new chain to be a main chain that does not fork, in response to the condition that L<G, determining the new chain to be a forked chain; and in response to the condition that G ⩽ L ⩽ G, determining that it cannot be decided whether the new chain forks, wherein G represents a minimum number of trusted nodes in the s consecutive blocks.

In some embodiments, the node $A_n$ forcibly uses only once the private key $PK'_n$, and a key pair for each of the s consecutive blocks $B_n$ to $B_{n+s}$ is regenerated.

In some embodiments, the public key $PK_n$ is generated based on a hash signature algorithm, wherein the hash signature algorithm comprises a Lamport algorithm.

In some embodiments, the processor is further configured to place the signature in a location other than the block $B_m$ of the blockchain to ensure that in response to the subsequent generation of a block $B_m$ in the blockchain, the signature can be placed in the block $B_m$.

In some embodiments, the processor is configured to deposit the signature as a transaction in the blockchain.

In some embodiments, the processor is configured to copy the signature to obtain a copied signature and store both the signature and the copied signature on the blockchain.

In some embodiments, the processor is further configured to, in response to the subsequent generation of a block $B_m$ in the blockchain, check the legitimacy of the signature before placing the signature in the block $B_m$, wherein the signature passing the legitimacy check proceeds to be executed with placing the signature in the block $B_m$, while the signature not passing the legitimacy check is considered by the blockchain as an illegitimate signature, and thereby is refused to be executed with placing the signature in the block $B_m$.

In some embodiments, the signature process is performed in a trusted execution environment.

In some embodiments, the blockchain is a public chain.

In some embodiments, a Genesis block of the blockchain is fully trusted, wherein a node of the Genesis block or a node of another block authorized by the Genesis block establishes a first backlink for the Genesis block, and after the first backlink appears, a probability of forking occurring within the s consecutive blocks covered by the first backlink is zero.

In some embodiments, determination of whether a new block is a head on the forked chain cannot be achieved in a case where a small amount of blocks exist at a head and tail of the blockchain, the processor is configured to: in a case where the new block is at a position of a closest suspected fork point, all blocks before the new block are in the main chain, and a node creating the new block has not formed and placed a complete backlink in the blockchain, performing a short-term signature on a block or a block sequence that has been tamper-proof in successor blocks of the new block, and placing the short-term signature in one or more storage positions, so that when the number of successor blocks that have backlinks of the new block is less than s, if the short-term signature is not in real-time or expired, the short-term signature is used instead of the backlinks for determination; determining that the new block is on the forked chain in response to the short-term signature being absent or expired; or continuously waiting until a predetermined number of the backlinks are formed from the block to be determined, and determining whether the block to be determined is the head on the forked chain by determining whether the number of the backlinks satisfies the predetermined numerical range.

In some embodiments, the processor is further configured to perform a search on a chain portion other than the main chain of the blockchain to confirm whether there exists a duplicate signer that performs a duplicate signature on the backlinks, wherein the duplicate signer represents a plurality of nodes that perform signature on two blocks to be generated, and the two blocks to be generated are respectively on the main chain and the forked chain, so that the forked chain is found according to a block created by the duplicate signer.

In some embodiments, the processor is configured to, for a suspected forked chain, compare the main chain portion before the suspected forked chain and a chain structure after an intersection of the suspected forked chain and the main chain, wherein the main chain comprises the backlinks, and if a comparison result shows a significant difference in the number of the backlinks, the suspected forked chain is determined to be a forked chain, or otherwise, the suspected forked chain is determined to be the main chain.

In some embodiments, the processor is configured to, in response to using the private key $PK'_n$ to sign on the block $B_{n+s}$, delete the private key $PK'_n$ to prevent it from being abused.

In one aspect of the present disclosure, a machine-readable storage medium having stored a computer program thereon is also provided, wherein the computer program, when executed by a processor, implements the method for preventing blockchain forks as described above.

Compared with the prior art, the advantageous effects of the present disclosure are as follows, first, the technical solution of the present disclosure is to ensure that a new user who only learns the information of the Genesis block can still join the main chain very securely and ensure block generation, and the implementation of such secure joining depends only on the state of the blockchain itself, rather than on the nature of the network system in which the blockchain is located. Secondly, due to the technical solution according to the present disclosure, a bad node intended to produce a fork will give up the evil of forking under consideration of a game, with knowledge of a new protocol mode of the public chain.

BRIEF DESCRIPTION OF THE DRAWINGS

The novel features of the present invention are set forth in detail in the appended claims. A better understanding of the features and advantages of the present invention will be obtained by reference to the following detailed description and accompanying drawings in which illustrative embodiments utilizing the principles of the present invention are set forth. The drawings are only for the purpose of illustrating the embodiments and should not be considered as limiting the invention. And throughout the drawings, the same elements are denoted by the same reference numerals, in which:

FIG. 6 illustrates a state diagram when determination of whether a new block is a head on a forked chain cannot be achieved according to a conventional method in a case where a block $B_m$ does not exist according to an exemplary embodiment of the present disclosure:

FIG. 7 illustrates a state diagram when determination of whether a new block is a head on a forked chain cannot be achieved according to a conventional method in a case where a block $B_{n+s}$ has not become a tamper-proof block according to an exemplary embodiment of the present disclosure;

DETAILED DESCRIPTION OF THE INVENTION

Exemplary embodiments of the present disclosure will be described in more detail below with reference to the accompanying drawings. While exemplary embodiments of the present disclosure are shown in the accompanying drawings, it should be understood that the present disclosure may be implemented in various forms and should not be limited by the embodiments set forth herein. Rather, these embodiments are provided so that the present disclosure will be more thoroughly understood, and will fully convey the scope of the present disclosure to those skilled in the art. Nothing in the following detailed description is intended to indicate that any particular component, feature, or step is essential to the present invention. Those skilled in the art will appreciate that various features or steps may be substituted for or combined with each other without departing from the scope of the present disclosure.

A blockchain applied in this embodiment is composed of a series of blocks at any time, that is, the format of a public chain is composed of a series of numerical blocks. Those skilled in the art can understand that the number of blocks can be defined using the number of blocks in any manner known in the art or in the future, such as several millions or more, and the present invention is not limited in this respect.

Figure 1:
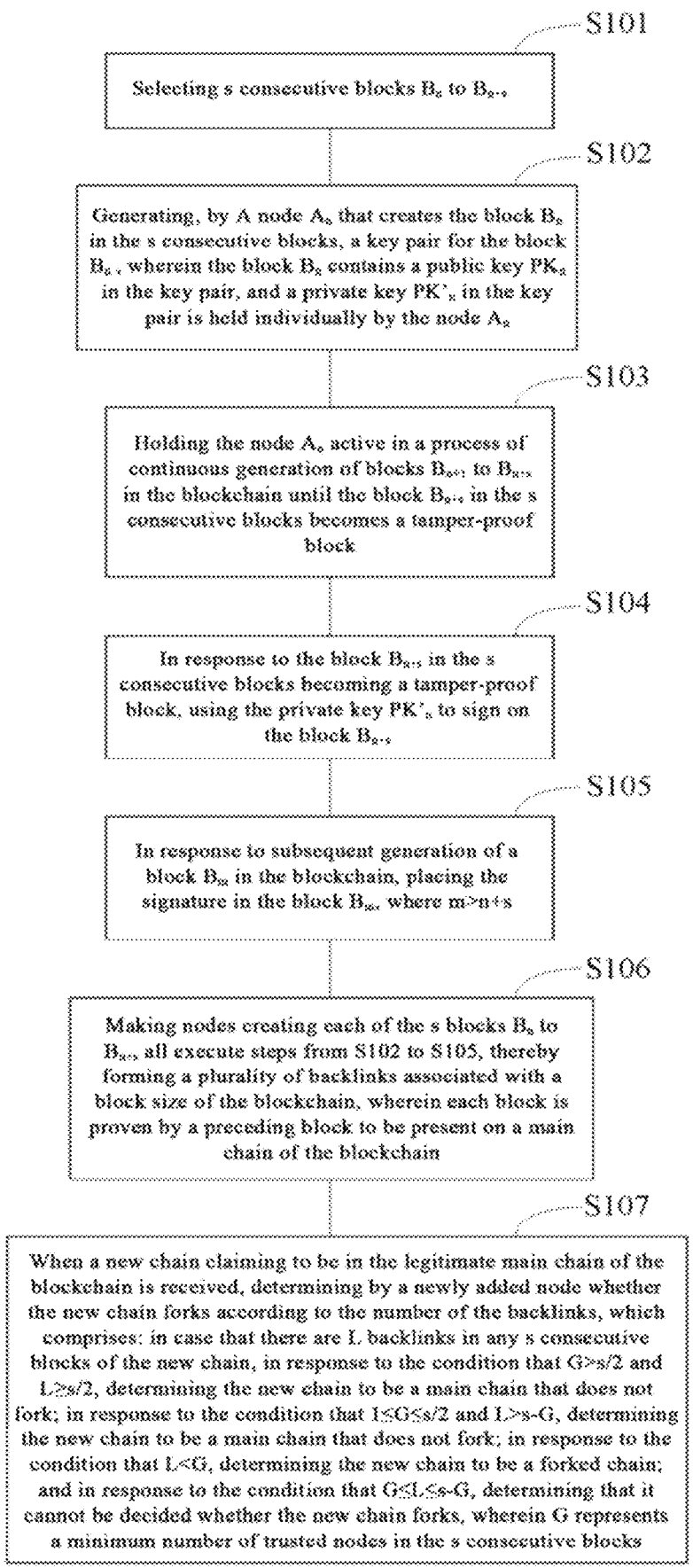
FIG. 1 illustrates a flowchart of a method for preventing forking of blockchain according to an exemplary embodiment of the present disclosure.

FIG. 1 illustrates a flowchart of a method for preventing blockchain forks according to an exemplary embodiment of the present disclosure. As shown in FIG. 1, a backlink method for preventing forking of blockchain is shown, which is proposed based on the following assumptions for blockchain architecture.

First, everyone knows that the entire blockchain is determined and identified by a Genesis block (which is hereafter defined as $B_0$), including the numerical value of its Genesis block $B_0$, rather than a particular storage location.

Second, at any time, there will be a set of several active nodes interacting with the public chain where they are located, and all active nodes have currently more reliable signature modes, such as key pairs. And assuming that most of these nodes are trusted nodes, these trusted nodes should actively respond to and support the protocol.

Third, all nodes in the set of active nodes can know the changes in the head of the blockchain and its vicinity, and except for the part of nodes that have just become active, all other good nodes in the set of active nodes can know the changes in the head and its vicinity.

Fourth, as a plurality of blocks become tamper-proof blocks, the tamper-proof property eventually becomes a consensus after a network-wide broadcast by notifying all nodes in the set of active nodes, nodes in the set of active nodes, and users who only pay attention to yet do not participate in the main chain can be notified about the blocks that become tamper-proof blocks, and the nodes and the users also know from each other that the other party has learned the above information.

Fifth, a node can leave or join the active nodes freely, the way of joining the active nodes is to know the numerical values of a plurality of blocks at the head of the blockchain, and the way of joining is the focus of the present invention, that is, how to determine that the joining corresponds to the real head of the main chain.

Sixth, once the node successfully identifies the real head information of the main chain, it may become familiar with all information and activities near the node and can accurately follow the development of the entire main chain.

The concept proposed based on the above assumptions attempts to implant an upward-pointing link. i.e., the backlink of the present invention, into the blockchain in the case where the existing blockchain has already held a conventional downward-pointing link. However, such implantation cannot be done at the expense of changing the existing blocks in the blockchain, which is neither desirable nor possible. For this purpose, some ingenious mechanisms are to be designed to accomplish the implantation of the backlinks by the nodes belonging to the same set that generated the preceding blocks without any features about the set or with observation only from an outside perspective of the blockchain. This practice is not entirely secure from the perspective of the trustworthiness of all the preceding nodes to a large extent, but can prevent forking of blockchain on a probabilistic basis.

This method is implemented by running a block creation algorithm with the following attributes in a blockchain environment under development.

I. The creator (miner or node) of each block is selected through a process in which the probability of the selected creator being an honest creator is assumed to be at least p, p being a value greater than 0.5.

II. It has been decided to use the following backlink protocol on a sequence of blocks $B_n$ (which may include all blocks) in conjunction with a parameters, in order to effectively determine, with the support of the backlink protocol, whether a case in which anyone of any s consecutive blocks is not one of the above sequences but is created by an honest creator is impossible (i.e., the probability of this case occurring is negative). Preferably, it is determined whether the probability that the number of blocks created by the honest creator in any s consecutive blocks is less than or equal to half of the total number of blocks is negative, i.e., impossible.

III. All participants know the selected sequence headed by the block $B_n$.

Based on the above, the method comprises the following steps: S101, selecting s consecutive blocks $B_n$ to $B_{n+s}$. According to the basic assumption of the blockchain, if the consecutive blocks are all located on the main chain of the blockchain, more than 50% of the blocks in the s consecutive blocks are created by trusted nodes. That is, the proportion of trusted nodes in all nodes create the s consecutive blocks is at least p, and the proportion of untrusted nodes is q, where q=1−p, the numerical values of p and q are unique and p>q; In consideration of blocks $B_n$ to $B_{n+s}$, a link is created therebetween, under which $B_n$ actually proves $B_{n+s}$, and each block of $B_{n+1} \ldots B_{n+s}$ proves by the traditional blockchain link. A node that creates $B_n$ is named $A_n$; S102, the node $A_n$ that creates the block Bn in the consecutive s blocks generates a key pair for the block $B_m$, wherein the block $B_n$ contains a public key $PK_n$ in the key pair, and a private key $PK'_n$ in the key pair is held individually by the node $A_n$; S103, holding the node $A_n$ active in a process of continuous generation of blocks $B_{n+1}$ to $B_{n+s}$ in the blockchain. That is, the node has always been participating in the constriction of the blockchain, and will not become a zombie node, until the block $B_{n+s}$ in the s consecutive blocks becomes a tamper-proof block; S104, in response to the block $B_m$, in the s consecutive blocks becoming a tamper-proof block, using the private key $PK'_n$ to sign on the block $B_{n+s}$; S105, in response to the subsequent generation of a block $B_m$ in the blockchain, placing the signature in the block $B_m$, where m>n+s; S106, forming a plurality of backlinks associated with a block size of the blockchain, when the generation node for each of the s consecutive blocks has completed the above steps. Since the signature is obtained by signing the block $B_{n+s}$ using the private key in the key pair of the block $B_m$ generated by node A, the access to the block $B_m$ actually includes the verification of the link from the block $B_m$ to the block $B_{n+s}$, thereby ensuring that the growth of the blockchain is performed on the main chain, and that each block is proved by an earlier block; S107, when a new chain claiming to be on the legitimate main chain of the blockchain is received, determined by a newly added node whether the blockchain forks according to the pattern and number of the backlinks. The pattern of the so-called backlinks is the specific link form of the backlink realized through the loop of steps S101-S105, and those skilled in the art should be well aware that, according to the existing architecture of the blockchain, it is necessary to first determine whether the new block belongs to a legitimate blockchain before determining whether the new block belongs to the head of the forked chain of the blockchain, and if the new block does not belong to blocks on the legitimate blockchain, it is unnecessary to perform the subsequent determination. The so-called legitimate blockchain includes the main chain and the forked chain derived from the same blockchain, and if the new block does not belong to the legitimate blockchain, it is meaningless to distinguish whether it is on the main chain or on the forked chain. The determination of this embodiment in this regard is based on the following structural characteristic of the blockchain; a blockchain is formed by a data structure in which blocks containing transaction information is sequentially linked from back to front, and each block points to a preceding block, and each block head contains a hash value of its preceding block, so that a chain that can trace back to the first block (the Genesis block) is created. According to the characteristics of the tree structure, it is determined whether the new block is located on a legal block chain by judging whether the new block finally points to the genesis block of the block chain through the traditional block chain link. In the affirmative case, the new block is located on the legitimate blockchain, or otherwise does not belong to the legitimate blockchain. Those skilled in the art may surely make a determination by other reasonable means in compliance with the characteristics of the blockchain architecture in the prior art.

For a block located on a legitimate blockchain, whether it is located on a forked chain is determined by determining the number of backlinks, which comprises: in case there are L backlinks in any s consecutive blocks of the new chain, in response to the condition that G>s/2 and only if $L \geqslant s/2$, determining the blockchain to be the main chain that does not fork; in response to the condition that $1 \leqslant G \leqslant s/2$, and only if L>s−G, determining blockchain to be the main chain that does not fork; in response to the condition that L<G, determining the blockchain to be a forked chain; and in response to the condition that $G \leqslant L \leqslant s-G$, determining that it cannot be decided whether forking occurs, and other types of evidence are also required for determination, wherein G represents a minimum number of trusted nodes in the s consecutive blocks.

Figure 2:
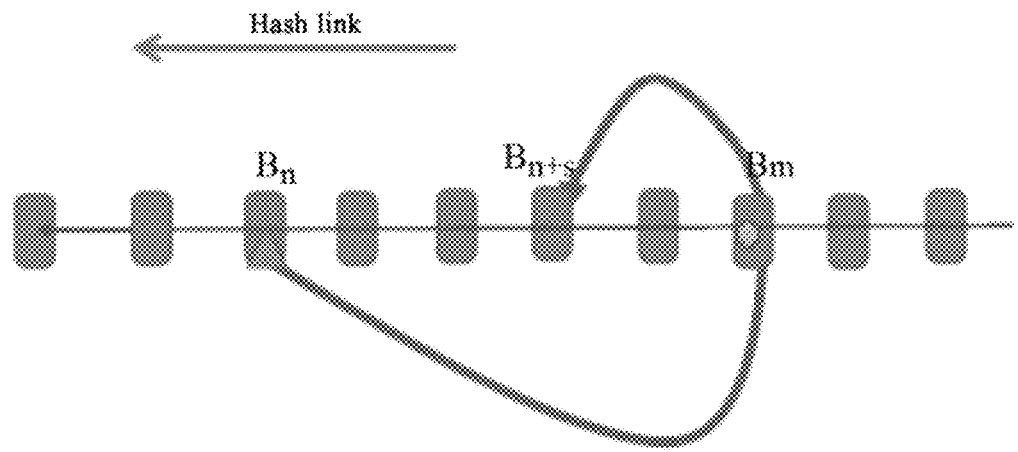
FIG. 2 illustrates a schematic diagram of a single backlink according to an exemplary embodiment of the present disclosure.

A schematic diagram of a single backlink formed according to the above method is shown in FIG. 2, which, for the sake of clarity, only shows the backlink relationship contained among three nodes with relatively short spacing, which reduces or eliminates the number of keys previously required.

In some embodiments, node $A_n$ uses only once the private key $PK'_n$, and a key pair for each of the s blocks $B_n$ to $B_{n+s}$ is regenerated.

In some embodiments, the public key is generated based on a hash signature algorithm, and the hash signature algorithm comprises a Lamport algorithm.

In some embodiments, the method further comprises placing the signature in a location other than the block $B_{n+s}$ of the blockchain to ensure that the signature can be placed in the block $B_m$ in the S105.

In some embodiments, the signature is deposited as a transaction in the blockchain. Because the signature is "transformed" to form the transaction and placed on the blockchain, the existing mechanism cannot ensure that the transaction as a signature will certainly become tamper-proof along with other ordinary transaction data within the same time range. If not guaranteed by a certain delay mechanism, the transaction may be discarded, so it is usually used together with a certain delay mechanism.

In some embodiments, the signature is copied to obtain a copied signature, and both the signature and the copied signature are stored on the blockchain.

In some embodiments, the legitimacy of the signature is checked before execution of the S105, and the signature passing the legitimacy check proceeds to be executed with the S105, while the signature not passing the legitimacy check is considered by the blockchain as an illegitimate signature, and thereby is refused to executed with the S105.

For the execution of S104, using the private key to sign the transaction block is the only security shield, and there is no server-side security assurance. A signature is just a means of control. If the signature process is not incorporated into the TEE enclave environment for execution, there is no system security at all. Therefore, the implementation of the entire method is ensured to take place in a trusted execution environment to construct a secure enclave environment so that a trusted root can be provided in a trusted computing field to provide security assurance for resident programs and data. The private key stored in the TEE, even the program of the method involved in the present invention can never be leaked out of the enclave nor can be derived for cracking analysis, so that the execution process (especially when invoking the input and output) also has security guarantees. Because cracking a program residing in the TEE is generally considered difficult, it is possible to choose the TEE device to fix the vendor number and serial number in order to uniquely identify the device.

In some embodiments, the blockchain is a public chain.

In some embodiments, a Genesis block of the blockchain is fully trusted, wherein a node of the Genesis block or a node of another block authorized by the Genesis block establishes a first backlink for the Genesis block, and after the first backlink appears, a probability of forking occurring within the s consecutive blocks covered by the first backlink is zero. This is because for any block within $B_0$ to $B_s$ it is first determined that a new node can be traced back to $B_0$ by tracing the parent block hash from $B_n$ and then it is uniquely determined that $B_0$ to $B_s$ are on the main chain because the backlink of $B_0$ uniquely proves that $B_s$ is its own legitimate successor block.

In some embodiments, determination of whether a new block is a head on the forked chain cannot be achieved in a case where a small amount of blocks exist at a head and tail of the blockchain, the method comprises: In the first way, the new block is at a position of a closest suspected fork point, all blocks before the new block are in the main chain, and a node creating the new block has not formed and placed a complete backlink in the blockchain, performing a short-term signature on a block or a block sequence that has been tamper-proof in successor blocks of the new block, and placing the short-term signature in one or more storage positions, so that when a number of successor blocks that have backlinks of the new block is less than s, if the short-term signature is not in real-time or expired, the short-term signature is used instead of the backlinks for determination; determining that the new block is on the forked chain in response to the short-term signature being absent or expired; or the second method is to continue to wait until a sufficient number of backlinks are formed from a block to be determined, wherein the number can be flexibly defined according to the application scenario of the blockchain, and is usually several hundreds or even more in scale. For the first manner, the specific implementation of the embodiment is to assume that $B_i$ is the closest suspected forking point that can be confirmed, that is, all the leading blocks of the block are on the main chain. A block creation node $A_j(i-j \leqslant s)$ before the block has not placed its backlinks in the blockchain, and the protocol requires that these nodes continue to focus on the growth of the blockchain, perform a short-term signature on a block or a block sequence that has been tamper-proof in its successor blocks, and place the short-term signature in some storage position (e.g., the transaction pool). By extending the above method, when the number of subsequent blocks of $B_i$ is less than s, if the short-term signature is not in real-time or expired, the short-term signature can be used to replace the original backlink for determination. If these short-term signatures do not exist or expire, it can be judged that $B_i$ is on the forked chain. The determined storage location may be a transaction pool, and the transaction pool is searched for a clue as to whether the block has become a tamper-proof block on the main chain while searching for a backlink. The transaction pool stores short-term signature information that has been signed. The short-term signature information is confirmation information that identifies a blockchain head location provided by a node that does not provide a backlink, and whether the block is a head on a forked chain is determined by accessing the short-term signature information in the transaction pool. In this embodiment, for example, whether the block is a block on the main chain of the blockchain can be determined by counting the voting information included in the short-term signature, and if more than 50% of voting information included in the short-term signature determines that the block is a block on the main chain, the block is identified to be a block on the main chain and accepted; otherwise, the new block is determined as a block on the forked chain. The purpose of this setup is to try to find more evidence about whether the new block is a head of the forked chain as a supplement, and a duplicate signer will use one public key to sign two blocks. Thus, while exposing his identity, he also exposes the new block generated on the forked chain, which in turn will reflect the location of the forked chain.

Figure 4:
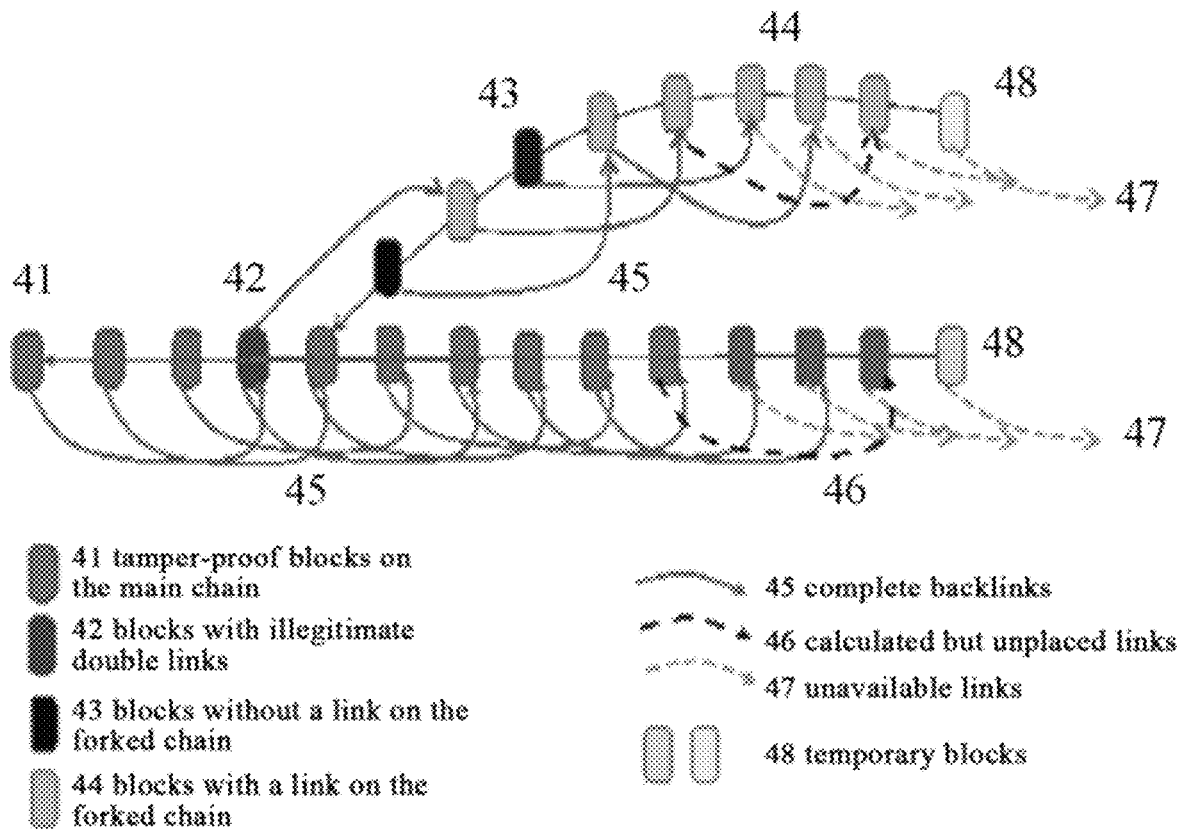
FIG. 4 illustrates a state diagram when determination of whether a new block is a head on a forked chain cannot be achieved according to a conventional method in a case where a small number of blocks exist in the head and tail of the blockchain according to an exemplary embodiment of the present disclosure.

Referring to FIG. 4, the blockchain includes tamper-proof blocks 41 on the main chain, blocks 42 with illegitimate double links, blocks 43 without a link on the forked chain, and blocks 44 with a link on the forked chain. Most of the tamper-proof blocks 41 have formed a complete backlink 45, however, a part of blocks that are close to the head have only completed the formation of the key pair and the formation of the partial signature, and still have not reached a time node of performing a second signature (i.e., step S105) after computations, thereby forming a calculated but unplaced link 46. Even some blocks that are closer to the head have not formed an available link, i.e., have formed an unavailable link 47. Those blocks that are close to the head, whether on the forked chain or the main chain, are referred to as temporary blocks 48.

FIGS. 5 to 8 illustrate in detail the two situations that occur in FIG. 4, respectively.

Figure 5:
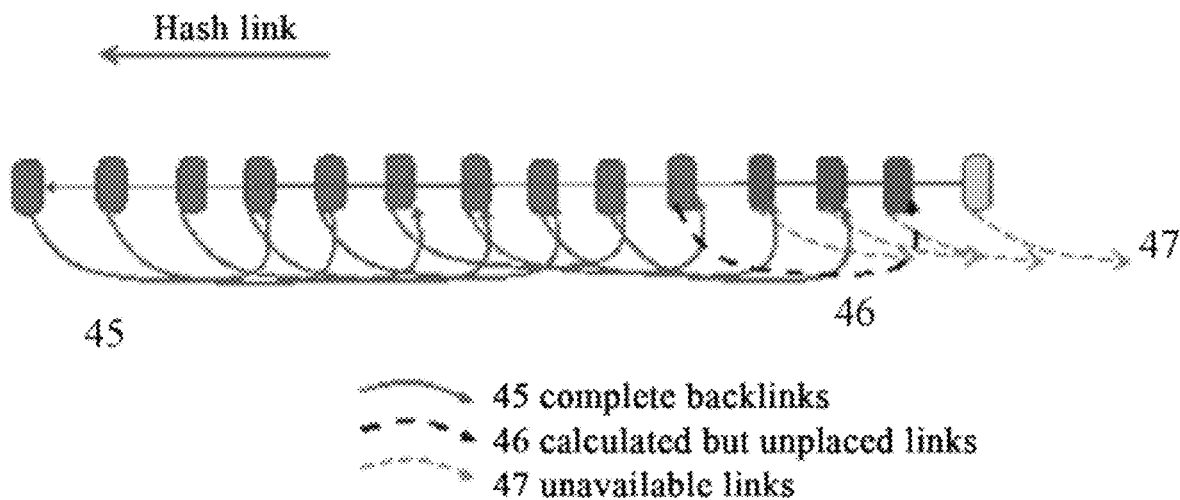
FIG. 5 illustrates a schematic diagram of three link forms associated with backlinks always present throughout the blockchain according to an exemplary embodiment of the present disclosure.

In FIG. 5, there are always three link forms associated with backlinks throughout the blockchain, i.e., complete backlinks 45, calculated but unplaced links 46, and unused links 47.

FIG. 6 describes a case where the method is executed only to step S104, that is, blocks $B_n$ to $B_{n+s}$ have been formed, but blocks after $B_{n+s}$ have not been generated, or only several blocks have been generated, and block $B_m$ has not been generated. In this case, the blockchain is in two states at the same time; a state 61, in which the public key material is located in $B_n$; and state 62, in which the signature/link is still located outside the blockchain, and the signature is not checked yet. Therefore, the short-term signature verification mode in the first manner is executed, in which case the short-term signature may be located in the transaction pool. Of course, the second waiting manner may also be adopted.

FIG. 7 describes a case where the method is executed only to step S102, that is, blocks $B_n$ to $B_{n+s}$ have been formed, but $B_{n+s}$ has not become a tamper-proof block, let alone the generation of block $B_m$. In this case, the blockchain is in three states at the same time; a state 71, in which the current block $B_m$ becomes a tamper-proof block; a state 72, in which the public key in the block $B_m$ is unavailable; and a state 73, in which $B_{n+s}$ is generated, but an untamperable block has not yet been formed, so that backlinks have not formed available backlinks. In fact, the state under FIG. 7 is a state corresponding to a point just previous to that of the state under FIG. 6. Therefore, it is still necessary to perform the short-term signature verification mode under the first manner, in which case the short-term signature may be located in the transaction pool. Of course, the second waiting manner can also be adopted.

Figure 8:
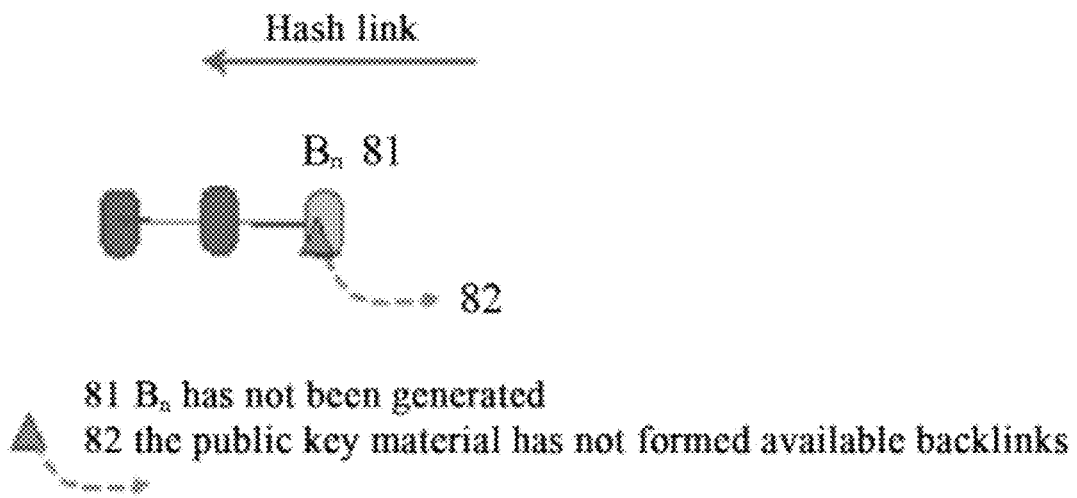
FIG. 8 illustrates a state diagram when determination of whether a new block is a head on a forked chain cannot be achieved according to a conventional method in a case where a block $B_m$ has not been formed according to an exemplary embodiment of the present disclosure.

FIG. 8 describes a case where the method is executed only to step S101, that is, $B_n$ has not been generated. In this case, blocks $B_n$ to $B_{n+s}$ have not become tamper-proof blocks, that is, block $B_m$ has not been generated yet. In this case, the blockchain is in two states at the same time; a state 81, in which the current block $B_n$ has not been generated; and a state 82, in which the public key material has not been formed, the key pair has also not been formed, and in this case, there is no available backlink. In fact, the state under FIG. 8 is a state corresponding to a point earlier than that of the state under FIG. 7. Therefore, it is still necessary to perform the short-term signature verification mode under the first manner, in which case the short-term signature may be located in the transaction pool. Of course, the second waiting manner can also be adopted.

Figure 9:
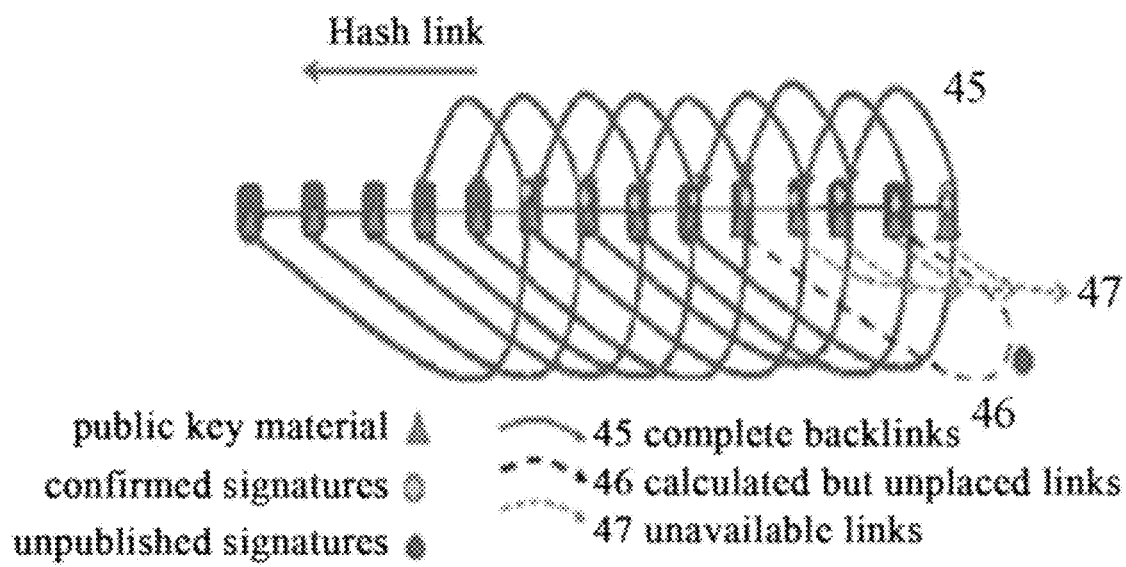
FIG. 9 illustrates a schematic diagram of a backlink pattern formed in a case where a complete backlink, a calculated but unplaced link (i.e., where the block $B_m$ has not occurred), and an unused link (i.e., where the block $B_m$ has not occurred) exist simultaneously on a main chain of the blockchain after formation of the backlink mechanism, according to an exemplary embodiment of the present disclosure.

FIG. 9 shows a backlink pattern formed in a case where a complete backlink 45, a calculated but unplaced link 46 (i.e., where the block $B_m$ has not occurred), and an unused link 47 (i.e., where the block $B_{n+s}$ has not occurred) exist simultaneously on a main chain of the blockchain after the formation of the backlink mechanism. Among the above, the public key material exists on each block of a sequence of selected s blocks and on the blocks on the main chain generated thereafter, that is, the creator of each block generates a corresponding key pair. In other words, a complete backlink portion (indicated by a solid arrow) only exists on block $B_m$ (the 6th block in this implementation) formed at the first execution of S105 and on subsequent blocks on the main chain, and a signature (indicated by a dotted arrow in the figure) placed without being checked also exists in the blockchain structure. In this case, the short-term signature verification mode under the first manner may be performed, in which case the short-term signature may be located in the transaction pool. Of course, the second waiting manner can also be adopted.

In some embodiments, the method further comprises performing a search on a chain portion other than the main chain to confirm whether there exists a duplicate signer that performs a duplicate signature on the backlinks, wherein the duplicate signer represents a plurality of nodes that perform signature on two blocks to be generated, and the two blocks to be generated are respectively on the main chain and the fork, so that the fork is found according to a block generated by the duplicate signer.

In some embodiments, for a suspected forked chain, by comparing a main chain before the suspected forked chain with a chain structure formed by the backlink after an intersection of the suspected forked chain, if there is a significant difference between the main chain before the suspected forked chain and the chain structure formed by the backlink of the chain after the intersection of one of the suspected forked chains, the suspected forked chain is determined to be a forked chain, or otherwise determined to be the main chain. Specifically, for the suspected forked chain, a main chain portion before the suspected forked chain and a chain structure after an intersection of the suspected forked chain and the main chain are compared, wherein the main chain comprises the backlinks, and if a comparison result shows a significant difference in the number of the backlinks, the suspected forked chain is determined to be a forked chain, or otherwise the suspected forked chain is determined to be a main chain. Of course, those skilled in the art may also not have to calculate a specific number of backlinks so as to save computing resources, but make a straightforward comparison of the data scale of the backlinks on the chain structure.

In some embodiments, in response to using the private key $PK'_n$ to sign on the block $B_{n+s}$ the private key $PK'_n$ is deleted to prevent it from being abused.

After the backlink mechanism is embedded in the blockchain, we test one block (defined as block B). The content of the test is the execution of the algorithm logic, wherein the algorithm logic includes: (1) all hash pointers are traced back to their respective root nodes, i.e., the Genesis block $B_0$. If the hash pointers are not traced back to the Genesis block, the block B is determined not to be a part of the blockchain; and (2) for externally determined constants r and s, it is set that the block B is at the m-th level, then for a block $B_{n+s}$ (n+s<m−r), the block $B_{n+s}$ is signed by using the private key corresponding to the public key included in the block $B_m$, where the constant r means waiting for at least r blocks, so that the signature can be included in the subsequent block. Here, the numerical range of r is agreed in advance by all the included nodes involved in the blockchain according to factors such as the generation speed of the block and the packing speed of the transaction. For example, the determined backlink must be generated within 20 blocks, so that the block generation range when the backlink is determined, and the verification of the backlink is completed, thereby improving the operability of the method.

The two logics of the algorithm are also verification logics. If at least one of the two verification logics fails, the verifier (i.e., the corresponding node) can determine that block B is not part of the main chain if the protocol follows the assumption that the main chain starts from the Genesis block.

This method possesses complete security and prevents forking. In the above embodiment, the generation sequence of blocks is $B_n$, $B_{n+s}$ $B_m$, to $B_m$, so as to clarify the actual physical meaning of the backlink, that is, the signature of the block $B_{n+s}$ by the private key corresponding to the public key in the block $B_n$ reveals the unique true inheritance relationship between the two blocks, and the backlink is actually included in the r blocks after the block $B_{n+s}$, so as to reveal the assumption related to the timestamp and ensure the authenticity and certainty of the verification. Therefore, according to the generation rule of the backlink, by taking a block that is r blocks ahead of the current block as a boundary, the generated blockchain can be guaranteed not to fork.

The method is performed on the premise that there should be s independent backlink overlays on every consecutive pair of blocks in the central portion of the blockchain, but the situation at the head and tail of the blockchain has a different appearance due to the insufficient number of forward and backward blocks, in which case a short fork phenomenon can easily occur.

Similarly, in a case where the number of blocks existing at the initial portion of the blockchain is less than s, the backlink mechanism cannot be initiated at all, and of course, when s is small, a long fork cannot be created.

For the above two cases, in some embodiments, when the number of blocks existing at the head and tail of the blockchain is small, one method is to continue when determining whether a block is a head on the forked chain, continuously waiting until a sufficient number of backlinks are formed from the block to be determined, and another method comprises searching the transaction pool for a clue as to whether the block is a block on the main chain while searching the blocks for backlinks. The information stored in the transaction pool is signed copied information provided by a plurality of nodes that do not provide backlinks with respect to the position of the head of the blockchain, and the copied information is accessed through the transaction pool for determination without storing the copied information in the chain, and the signature does not need to be a long-term signature.

Figure 3:
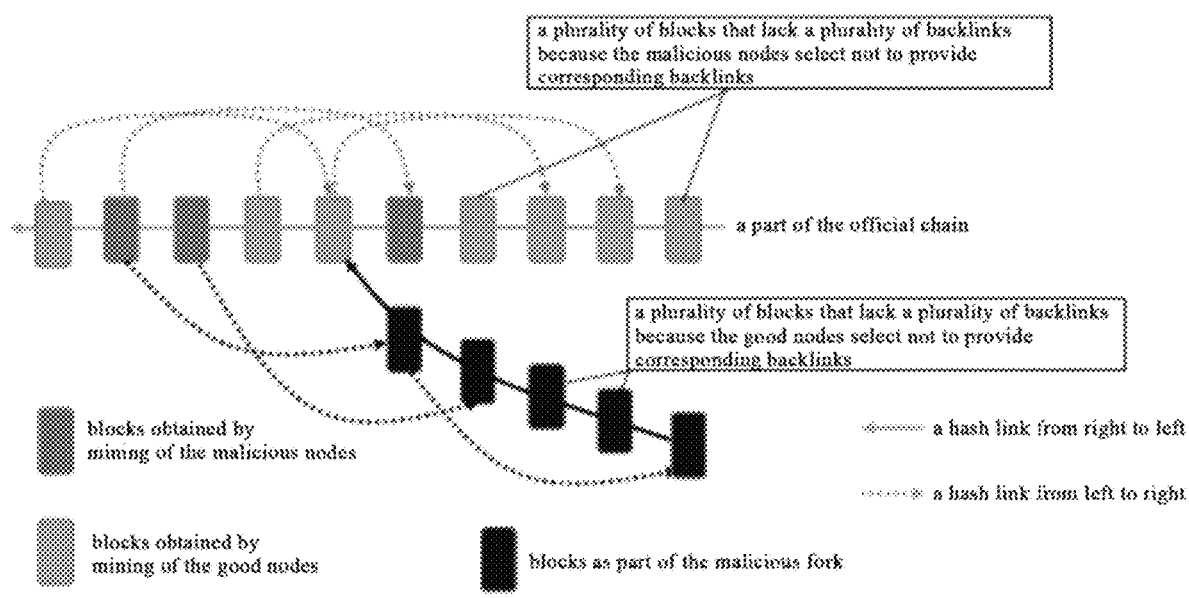
FIG. 3 illustrates a schematic diagram of a possible behavior pattern of a malicious node under a backlink mechanism according to an exemplary embodiment of the present disclosure.

Referring again to FIG. 3, particularly in a case where the value of s is small, bad nodes control a sufficient number of blocks that have been mined, making it more difficult to distinguish between the main chain and the forked chain. Therefore, the number of blocks involved in the related operation in the Genesis blocks also needs to be set according to the requirements of the system application. According to the general rules, it is assumed that the backlink detection protocol is set in every s consecutive block, having at least L desired signatures, and that the blockchain can be identified as an official chain or the main chain only after forming L backlinks. If the value range of L is not properly limited, the following two cases may occur; (L) false positive; the protocol identifies a blockchain that wrongly forks as the official chain or the main chain; (2) false negative; because the attacker attempts to limit the number of signatures to less than L, no L backlinks are formed, thus the protocol refuses to accept the real official chain or main chain.

Selecting the value range of L can avoid the simultaneous appearance of the above two cases. The assumption that an honest node providing a signature must provide the signature as soon as possible within the time defined by the protocol and that the provided signature is immediately received by the blockchain establishes on the basis that the constant r is selected to be large enough and at least one honest miner will comply with the protocol and include the signature in the block. Setting the minimum number of honest nodes in the s contiguous blocks to G, if L>G, and if no signature is provided by the bad miner, a false negative will occur according to the protocol. If L is less than or equal to the maximum number s−G of bad miners, according to the protocol, it is very easy for bad miners to generate forks, which results in the occurrence of a false positive. Therefore, the value range of L should be between s−G and G, i.e., s−G<L≦G, and G>s/2.

There is a typical game process for the attack on non-honest or bad nodes. First, these nodes need to make clear their own proportion in the s consecutive blocks, and know each other's existence, and reach cooperation, so as to determine the success probability in forking before the miner's fee or deposit losses caused by not providing a signature. And these bad nodes can also forge timestamps so that the honest nodes cannot perceive the forked node until it is broadcasted to the entire network. Because of the existence of the game, the attacker is also caught in a dilemma. On one hand, a normal participation in the generation and development of the main chain can obtain an expected income, but at the same time, the attacker needs to disguise himself to wait for the opportunity to fork. When the attacker should publish the signature yet refrain from doing so, in addition to economic losses, in fact, the attacker also exposes himself to the probability and identity that he may become a dishonest node, so that he may be found before the act of forking, which leads to failure. The dishonest node's motivation to do evil is lost, thus the dishonest node is pushed toward the direction of not doing evil on the public chain. In addition, the defense mechanism is mainly used to prevent long forks, where participants have a longer time to organize defense and impose punishment. If the selected s is large, the time waiting for ensuring whether the s blocks are on the main chain will be longer, and the miner will have to spend more time waiting. However, on the premise that no additional number of signatures is required (that is, one miner still provides one signature), this is still worthwhile with respect to the security against forking brought to the blockchain.

In some embodiments, forking is found by searching other chains for duplicate signers (i.e., a plurality of nodes signing two blocks to be generated) of a backlink.

In some embodiments, for a small portion (which, depending on the application scenario of the blockchain, is usually several or dozens in number) of suspected forked chains that are not determined to be official chains yet, by comparing the composition of the chains after the intersection of the two chains, if there is a great difference in the composition of one of the two chains after the intersection, it can be determined to be a forked chain, or otherwise it can be determined to be an official chain (i.e., the main chain).

Figure 10:
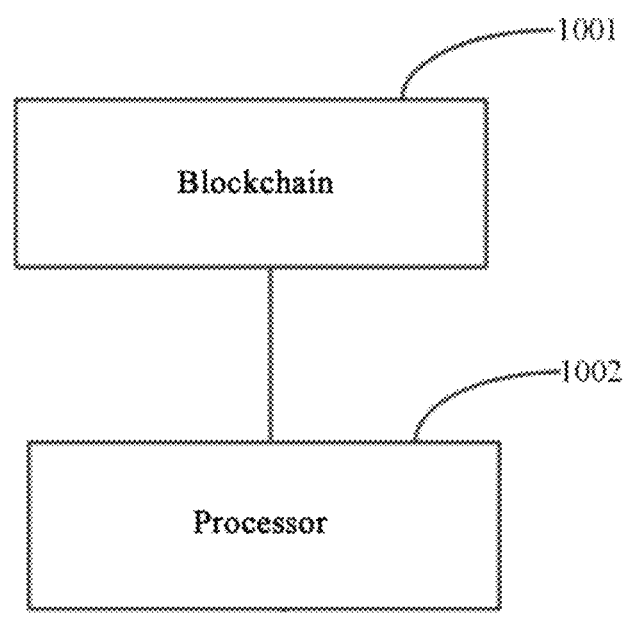
FIG. 10 illustrates a schematic structural diagram of a device for preventing blockchain forks according to an exemplary embodiment of the present disclosure.

FIG. 10 shows a schematic structural diagram of a device for preventing forking of blockchain according to an exemplary embodiment of the present disclosure. As shown in FIG. 10, the device for preventing blockchain forks includes a blockchain 1001 and a processor 1002, wherein the blockchain 1001 is capable of ensuring that information published thereon is tamper-proof. It is well known that the blockchain is a chained data structure formed by connecting data in chronological order in a series of blocks, and is also a tamper-proof and unforgeable distributed ledger that cryptographically guarantees data. Blockchain uses cryptography such as hash and signature and consensus algorithm to build a trust mechanism, which makes the cost of repudiation, tampering, and fraud huge and ensures data is tamper-proof and unforgeable. It may be realized that the blockchain may be implemented in any manner known in the art or known in the future, such as Bitcoin, Ethereum, etc. The processor 1002 may be used for the following.

Selecting s consecutive blocks $B_n$ to $B_{n+s}$. According to the basic assumption of the blockchain, if the consecutive blocks are all located on the main chain of the blockchain, more than 50% of the blocks in the s consecutive blocks are created by trusted nodes, that is, the proportion of trusted nodes in all nodes creating the s consecutive blocks is at least p, and the proportion of untrusted nodes is q, where q=1−p, the numerical values of p and q are unique and p>q; In consideration of blocks $B_n$ to $B_{n+s}$, a link is created therebetween, under which $B_n$ actually proves $B_{n+s}$, and each block of $B_{n+s}$ . . . $B_{n+s-1}$ is proven by the traditional blockchain link. A node that creates $B_n$ is named $A_n$; generating, by the node $A_n$ that creates the block $B_m$ in the s consecutive blocks, a key pair for the block $B_m$, wherein the block $B_m$ contains a public key $PK_n$ in the key pair, and a private key $PK'_n$ in the key pair is held individually by the node $A_n$; holding the node $A_n$ active in a process of continuous generation of blocks $B_{n+1}$ to $B_{n+s}$ in the blockchain, that is, the node has always been participating in the construction of the blockchain, and will not become a zombie node, until the block $B_{n+s}$ in the s consecutive blocks becomes a tamper-proof block; in response to the block $B_{n+s}$ in the s consecutive blocks becoming a tamper-proof block, using the private key $PK'_n$ to sign on the block $B_{n+s}$; in response to subsequent generation of a block $B_m$ in the blockchain, placing the signature in the block $B_m$, and forming a plurality of backlinks associated with the block size of the blockchain, when the generation node for each of the s consecutive blocks has completed the above steps, where m>n+s. Since the signature is obtained by signing the block $B_{n+s}$ using the private key in the key pair of the block $B_n$ generated by the node A, the access to the block $B_m$ actually includes the verification of the link from the block $B_m$ to the block $B_{n+s}$, thereby ensuring that the growth of the blockchain is performed on the main chain, and that each block is proved by an earlier block; when a new chain claiming to be on the legitimate main chain of the blockchain is received, determined by a newly added node whether the blockchain forks according to the pattern and number of the backlinks. The pattern of the so-called backlinks is the specific link form of the backlink realized through the loop of the steps implemented previously, and those skilled in the art should be well aware that, according to the existing architecture of the blockchain, it is necessary to first determine whether the new block belongs to a legitimate blockchain before determining whether the new block belongs to the head of the forked chain of the blockchain, and if the new block does not belong to blocks on the legitimate blockchain, it is unnecessary to perform the subsequent determination. The determination of this embodiment in this regard is made according to the following structural characteristic of the blockchain; a blockchain is formed by a data structure in which blocks containing transaction information is sequentially linked from back to front, and each block points to a preceding block, and each block head contains a hash value of its preceding block, so that a chain that can trace back to the first block (the Genesis block) is created. According to this tree structure characteristic, whether the new block is located on a legitimate blockchain can be determined by determining whether the new block can eventually point to the Genesis block of the blockchain through the traditional blockchain link, that is, whether the current blockchain structure meets the basic tree structure characteristic. Those skilled in the art may surely make a determination by other reasonable means in compliance with the characteristics of the blockchain architecture in the prior art.

For a new chain located on a legitimate blockchain, whether it is located on a forked chain is determined by determining the number of backlinks, which comprises: in case that there are L backlinks in any s consecutive blocks of the new chain, in response to the condition that G>s/2 and only if $L \geqslant s/2$, determining the blockchain to be a main chain that does not fork; in response to the condition that $1 \leqslant G \leqslant s/2$, and only if L>–G, determining the blockchain be a main chain that does not fork; in response to the condition that L<G, determining the blockchain to be a forked chain; and in response to the condition that $G \leqslant L \leqslant s-G$, determining that it cannot be decided whether forking occurs, and other types of evidence are also required for determination, wherein G represents a minimum number of trusted nodes in the s consecutive blocks.

In some embodiments, the node $A_n$ uses only once the private key $PK'_n$, and a key pair for each of the s blocks $B_n$ to $B_{n+s}$ is regenerated.

In some embodiments, the public key is generated based on a hash signature algorithm, and the hash signature algorithm comprises a Lamport algorithm that can only be signed once using a private key.

In some embodiments, the processor 1002 is further configured to place the signature in a location other than block $B_{n+s}$ of the blockchain to ensure that in response to the subsequent generation of a block $B_m$ in the blockchain, the signature can be placed in the block $B_m$.

In some embodiments, the processor 1002 is configured to deposit the signature as a transaction in the blockchain.

In some embodiments, the processor 1002 is configured to copy the signature to obtain a copied signature and store both the signature and the copied signature on the blockchain.

In some embodiments, the processor 1002 is configured to check the legitimacy of the signature before signing the block $B_{n+s}$ using the private key $PK'_n$ in response to the block $B_{n+s}$ in the s consecutive blocks becoming a tamper-proof block, wherein the signature passing the legitimacy check proceeds to be executed with placing the signature in the block $B_m$, while the signature not passing the legitimacy check is considered by the blockchain as an illegitimate signature, and thereby is refused to be executed with placing the signature in the block $B_m$.

In some embodiments, the signature process is performed in a trusted execution environment.

In some embodiments, the blockchain is a public chain.

In some embodiments, a Genesis block of the blockchain is fully trusted, wherein a node of the Genesis block or a node of another block authorized by the Genesis block establishes a first backlink for the Genesis block, and after the first backlink appears, a probability of forking occurring within the s consecutive blocks covered by the first backlink is zero. This is because for any block within $B_0$ to $B_s$ it is first determined that a new node can be traced back to $B_0$ by tracing the parent block hash from $B_s$, and then it is uniquely determined that $B_0$ to $B_s$ are on the main chain because the backlink of $B_0$ uniquely proves that $B_s$ is its own legitimate successor block.

In some embodiments, when determination of whether a new block is a head on the forked chain cannot be achieved in a case where a small amount of blocks exist at a head and tail of the blockchain, the processor 1002 is configured to implement; a first method in which the new block is at a position of a closest suspected forking point, all blocks before the new block are in the main chain, and a node creating the new block has not formed and placed a complete backlink in the blockchain, comprising performing a short-term signature on a block or a block sequence that has been tamper-proof in successor blocks of the new block, and placing the short-term signature in one or more storage positions, so that when a number of successor blocks that have backlinks of the new block is less than s, if the short-term signature is not in real-time or expired, the short-term signature is used instead of the backlink for determination; and determining that the new block is on the forked chain in response to the short-term signature being absent or expired; or a second method, comprising continuously waiting until a sufficient number of backlinks are formed from a block to be determined, wherein the number can be flexibly defined according to the application scenario of the blockchain, and is usually several hundreds or even more in scale. For the first method, a specific implementation of the embodiment is to assume that $B_i$ is the closest suspected forking point that can be confirmed, that is, all the leading blocks of the block are on the main chain. A block creation node $A_j$ (i–j $\leqslant$ s) before the block has not placed its backlinks in the blockchain, and the protocol requires that those nodes continue to focus on the growth of the blockchain, perform a short-term signature on a block or a block sequence that has been tamper-proof in its successor blocks, and place the short-term signature in some storage position (e.g., the transaction pool). By extending the above method, when the number of subsequent blocks of $B_i$ is less than s, if the short-term signature is not in real-time or expired, the short-term signature is used instead of an original backlink for determination. If, on the contrary, these short-term signatures do not exist or expire, $B_i$ can be determined to be located on the forked chain. The determined storage location may be a transaction pool, and the transaction pool is searched for a clue as to whether the block has become a tamper-proof block on the main chain while searching for a backlink. The transaction pool stores short-term signature information that has been signed. The short-term signature information is confirmation information that identifies the blockchain head location provided by a node that does not provide a backlink, and whether the block is a head on a forked chain is determined by accessing the short-term signature information in the transaction pool. In this embodiment, for example, whether the block is a block on the main chain of the blockchain can be determined by counting voting information included in the short-term signature, and if more than 50% of voting information included in the short-term signature determines that the block is a block on the main chain, the block is identified to be a block on the main chain and accepted; otherwise, the new block is determined as a block on the forked chain. The purpose of this setup is to try to find more evidence as to whether the new block is a head of the forked chain as a supplement, and a duplicate signer will use a public key to sign two blocks, thus exposing his identity while exposing the new block generated by himself on the forked chain, which in turn will reflect the location of the forked chain.

In some embodiments, the processor 1002 is further configured to perform a search on a chain portion other than the main chain to confirm whether there exists a duplicate signer that performs duplicate signature on the backlink, wherein the duplicate signer represents a plurality of nodes that perform signature on two blocks to be generated, and the two blocks to be generated are respectively on the main chain and the forked chain, so that the forked chain is found according to a block generated by the duplicate signer.

In some embodiments, the processor 1002 is configured to compare, for a suspected forked chain, a main chain portion before the suspected forked chain and a chain structure after an intersection of the suspected forked chain and the main chain, wherein the main chain comprises the backlinks, and if a comparison result shows a significant difference in the number of the backlinks, the suspected forked chain is determined to be a forked chain, otherwise, the suspected forked chain is determined to be a main chain.

In some embodiments, the processor 1002 is configured to delete, in response to using the private key $PK'_n$ to sign on the block $B_{n+s}$ the private key $PK'_n$ to prevent it from being abused.

Thus, the method ensures that the previous transaction page in the blockchain restricts the subsequent transaction page. Because the number of blocks in this mechanism is selected to be large enough, the basic assumption of blockchain is satisfied, that is, the number of malicious bookkeepers is small, so the number of link ropes that can be migrated to the forged ledger at the back end is small. Thus, the verification on the number of backlinks in the method cannot be passed, and a fork cannot be successfully forged.

In one aspect of the present disclosure, there is further provided a machine-readable storage medium on which a computer program is stored, wherein the computer program, when executed by a processor, implements the method for preventing forking of blockchain as described above. The technical solution of the method for preventing forking of blockchain has been described in detail above, and is not repeated herein. In some embodiments, the machine-readable storage medium is a tangible component of a digital processing device. In other embodiments, the machine-readable storage medium is optionally removable from a digital processing device. In some embodiments, by way of non-limiting example, the machine-readable storage medium may include a USB disk, a removable hard disk, a read-only memory (ROM), a random access memory (RAM), a flash memory, a programmable read-only memory (PROM), an erasable programmable read-only memory (EPROM), a solid state memory, a magnetic disk, an optical disk, a cloud computing system or a service, or the like.

It should be understood that the steps described in the method embodiment of the present disclosure may be performed in a different order and/or in parallel. Further, the method embodiment may include additional steps and/or omit the steps shown in implementation. The scope of the invention is not limited in this respect.

A number of specific details are described in the specification provided herein. However, it should be understood that embodiments of the present disclosure may be practiced without these specific details. In some embodiments, well-known methods, structures, and techniques are not shown in detail so as not to obscure the understanding of this specification.

Although exemplary embodiments of the present invention have been shown and described herein, it will be readily understood by those skilled in the art that such embodiments are provided by way of example only. Many modifications, changes and alternatives will now occur to those skilled in the art without departing from the invention. It should be understood that various alternatives to the embodiments of the invention described herein may be employed in the practice of the invention. The following claims are intended to limit the scope of the invention and thus cover the methods and structures within the scope of these claims and their equivalents.

What is claimed is:

1. A method for preventing forking of a blockchain, characterized in that the method is realized by establishing a backlink for each block of the blockchain and making a determination according to a number of backlinks, comprising steps of:

S101, selecting s consecutive blocks $B_n$ to $B_{n+s}$;

S102, generating, by a node $A_n$ that creates the block $B_n$ in the s consecutive blocks, a key pair for the block $B_n$, wherein the block $B_n$ contains a public key $PK_n$ in the key pair, and a private key $PK'_n$ in the key pair is held individually by the node $A_n$;

S103, holding the node $A_n$ active in a process of continuous generation of blocks $B_{n+1}$ to $B_{n+s}$ in the blockchain until the block $B_{n+s}$ in the s consecutive blocks becomes a tamper-proof block;

S104, in response to the block $B_{n+s}$ in the s consecutive blocks becoming a tamper-proof block, using the private key $PK'_n$ to sign on the block $B_{n+s}$ generating a signature;

S105, in response to the subsequent generation of a block $B_m$ in the blockchain, placing the signature in the block $B_m$, where m>n+s;

S106, making nodes creating each of the s consecutive blocks $B_n$ to $B_{n+s}$ all execute steps S102 to S105, thereby forming a plurality of backlinks associated with a block size of the blockchain, wherein each block is proven by a preceding block to be present on a main chain of the blockchain; and S107, when a new chain claiming to be on the legitimate main chain of the blockchain is received, determining by a newly added node whether the new chain forks according to the number of the backlinks, which comprises: in case that there are L backlinks in any s consecutive blocks of the new chain, in response to the condition that G>s/2 and L≥s/2, determining the new chain to be a main chain that does not fork; in response to the condition that 1≤G≤s/2 and L>s−G, determining the new chain to be a main chain that does not fork; in response to the condition that L<G, determining the new chain to be a forked chain; and in response to the condition that G≤L≤s−G, determining that it cannot be decided whether the new chain forks, wherein G represents a minimum number of trustworthy nodes in the s consecutive blocks.

2. The method of claim 1, characterized in that the node $A_n$ uses only once the private key $PK'_n$, and a key pair for each of the s consecutive blocks $B_n$ to $B_{n+s}$ is regenerated.

3. The method of claim 1, characterized in that the public key $PK_n$ is generated based on a hash signature algorithm, wherein the hash signature algorithm comprises a Lamport algorithm.

4. The method of claim 1, characterized in further comprising placing the signature in a location other than the block $B_{n+s}$ of the blockchain to ensure that the signature can be placed in the block $B_m$ in the step S105.

5. The method of claim 4, characterized in that the signature is deposited as a transaction in the blockchain.

6. The method of claim 4, characterized in that the signature is copied to obtain a copied signature and both the signature and the copied signature are stored on the blockchain.

7. The method of claim 1, characterized in that legitimacy of the signature is checked before execution of the step S105, and the signature passing the legitimacy check proceeds to be executed with the step S105, while the signature not passing the legitimacy check is considered by the blockchain as an illegitimate signature, and thereby is refused to be executed with the step S105.

8. The method of claim 1, characterized in that the signing process in the step S104 is performed in a trusted execution environment.

9. The method of claim 1, characterized in that the blockchain is a public chain.

10. The method of claim 1, characterized in that a Genesis block of the blockchain is fully trusted, wherein a node of the Genesis block or a node of another block authorized by the Genesis block establishes a first backlink for the Genesis block, and after the first backlink appears, a probability of forking occurring within the s consecutive blocks covered by the first backlink is zero.

11. The method of claim 1, characterized in that determination of whether a new block is a head on the forked chain cannot be achieved in a case where a small amount of blocks exist at a head and tail of the blockchain, the method comprising:

in a case where the new block is at a position of a closest suspected forking point, all blocks before the new block are in the main chain, and a node creating the new block has not formed and placed a complete backlink in the blockchain, performing a short-term signature on a block or a block sequence that has been tamper-proof in successor blocks of the new block, and placing the short-term signature in one or more storage positions, so that when the number of successor blocks that have backlinks of the new block is less than s, if the short-term signature is not in real-time or expired, the short-term signature is used instead of the backlinks for determination;

determining that the new block is on the forked chain in response to the short-term signature being absent or expired; or continuously waiting until a predetermined number of the backlinks are formed from the block to be determined by executing steps S101-S106 of the method, and determining whether the block to be determined is a head on the forked chain by determining whether the number of the backlinks satisfies a predetermined numerical range.

12. The method of claim 1, characterized in further comprising performing a search on a chain portion other than the main chain of the blockchain to confirm whether there exists a duplicate signer that performs duplicate signing on the backlinks, wherein the duplicate signer represents a plurality of nodes that perform signing on two blocks to be generated, and the two blocks to be generated are respectively on the main chain and the forked chain, so that the forked chain is found according to a block created by the duplicate signer.

13. The method of claim 1, characterized in that for a suspected forked chain, a main chain portion before the suspected forked chain and a chain structure after an intersection of the suspected forked chain and the main chain are compared, wherein the main chain comprises the backlinks, and if a comparison result shows a significant difference in the number of the backlinks, the suspected forked chain is determined to be a forked chain, or otherwise the suspected forked chain is determined to be a main chain.

14. The method of claim 1, characterized in that in response to using the private key $PK'_n$ to sign on the block $B_{n+s}$ in the step S104, the private key $PK'_n$ is deleted to prevent it from being abused.

15. A device for preventing forking of blockchain, characterized in comprising a blockchain and a processor, wherein the blockchain can ensure that information published thereon is tamper-proof, and the processor is configured to:

selecting s consecutive blocks $B_n$ to $B_{n+s}$;

generating, by a node $A_n$ that creates the block $B_n$ in the s consecutive blocks, a key pair for the block $B_n$, wherein the block $B_n$ contains a public key $PK_n$ in the key pair, and a private key $PK'_n$ in the key pair is held individually by the node $A_n$;

holding the node $A_n$ active in a process of continuous generation of blocks $B_{n+1}$ to $B_{n+s}$ in the blockchain until the block $B_{n+s}$ in the s consecutive blocks becomes a tamper-proof block;

in response to the block $B_{n+s}$ in the s consecutive blocks becoming a tamper-proof block, using the private key $PK'_n$ to sign on the block $B_{n+s}$ generating a signature;

in response to the subsequent generation of a block $B_m$ in the blockchain, placing the signature in the block $B_m$, where m>n+s;

making nodes creating each of the s consecutive blocks $B_n$ to $B_{n+s}$ all execute the foregoing processes, thereby forming a plurality of backlinks associated with a block size of the blockchain, wherein each block is proven by a preceding block to be present on a main chain of the blockchain; and when a new chain claiming to be on the legitimate main chain of the blockchain is received, determining by a newly added node whether the new chain forks according to the number of the backlinks, which comprises: in case that there are L backlinks in any s consecutive blocks of the new chain, in response to the condition that G>s/2 and L≥s/2, determining the new chain to be a main chain that does not fork; in response to the condition that 1≤G≤s/2 and L>s−G, determining the new chain to be a main chain that does not fork; in response to the condition that L<G, determining the new chain to be a forked chain; and in response to the condition that G≤L≤s−G, determining that it cannot be decided whether the new chain forks, wherein G represents a minimum number of trustworthy nodes in the s consecutive blocks.

16. The device of claim 15, characterized in that the node $A_n$ uses only once the private key $PK'_n$, and a key pair for each of the s consecutive blocks $B_n$ to $B_{n+s}$ is regenerated.

17. The device of claim 15, characterized in that the public key $PK_n$ is generated based on a hash signature algorithm, wherein the hash signature algorithm comprises a Lamport algorithm.

18. The device of claim 15, characterized in that the processor is further configured to place the signature in a location other than the block $B_{n+s}$ of the blockchain to ensure that in response to the subsequent generation of a block $B_m$ in the blockchain, the signature can be placed in the block $B_m$.

19. The device of claim 18, characterized in that the processor is configured to deposit the signature as a transaction in the blockchain.

20. The device of claim 18, characterized in that the processor is configured to copy the signature to obtain a copied signature and store both the signature and the copied signature on the blockchain.

21. The device of claim 15, characterized in that the processor is further configured to, in response to the subsequent generation of a block $B_m$ in the blockchain, check legitimacy of the signature before placing the signature in the block $B_m$, wherein the signature passing the legitimacy check proceeds to be executed with placing the signature in the block $B_m$, while the signature not passing the legitimacy check is considered by the blockchain as an illegitimate signature, and thereby is refused to be executed with placing the signature in the block $B_m$.

22. The device of claim 15, characterized in that the signing process generating the signature is performed in a trustworthy execution environment.

23. The device of claim 15, characterized in that the blockchain is a public chain.

24. The device of claim 15, characterized in that a Genesis block of the blockchain is fully trusted, wherein a node of the Genesis block or a node of another block authorized by the Genesis block establishes a first backlink for the Genesis block, and after the first backlink appears, a probability of forking occurring within the s consecutive blocks covered by the first backlink is zero.

25. The device of claim 15, characterized in that determination of whether a new block is a head on the forked chain cannot be achieved in a case where a small amount of blocks exist at the head and tail of the blockchain, the processor is configured to:
in a case where the new block is at a position of a closest suspected forking point, all blocks before the new block are in the main chain, and a node creating the new block has not formed and placed a complete backlink in the blockchain, performing a short-term signature on a block or a block sequence that has been tamper-proof in successor blocks of the new block, and placing the short-term signature in one or more storage positions, so that when the number of successor blocks that have backlinks of the new block is less than s, if the short-term signature is not in real-time or expired, the short-term signature is used instead of the backlinks for determination;
determining that the new block is on the forked chain in response to the short-term signature being absent or expired; or
continuously waiting until a predetermined number of the backlinks are formed from the block to be determined, and determining whether the block to be determined is a head on the forked chain by determining whether the number of the backlinks satisfies a predetermined numerical range.

26. The device of claim 15, characterized in that the processor is further configured to perform a search on a chain portion other than the main chain of the blockchain to confirm whether there exists a duplicate signer that performs the duplicate signing on the backlinks, wherein the duplicate signer represents a plurality of nodes that perform signing on two blocks to be generated, and the two blocks to be generated are respectively on the main chain and the forked chain, so that the forked chain is found according to a block created by the duplicate signer.

27. The device of claim 15, characterized in that the processor is configured to, for a suspected forked chain, compare a main chain portion before the suspected forked chain and a chain structure after an intersection of the suspected forked chain and the main chain, wherein the main chain comprises the backlinks, and if a comparison result shows a significant difference in the number of the backlinks, the suspected forked chain is determined to be a forked chain, or otherwise the suspected forked chain is determined to be a main chain.

28. The device of claim 15, wherein the processor is configured to, in response to using the private key $PK'_n$ to sign on the block $B_{n+s}$, delete the private key $PK'_n$ to prevent it from being abused.

29. A non-transitory machine-readable storage medium stored a computer program thereon, wherein the computer program, when executed by a processor, implements the method for preventing forking of blockchain of any one of claims 1 to 14.

* * * * *